Figures 6, 7:
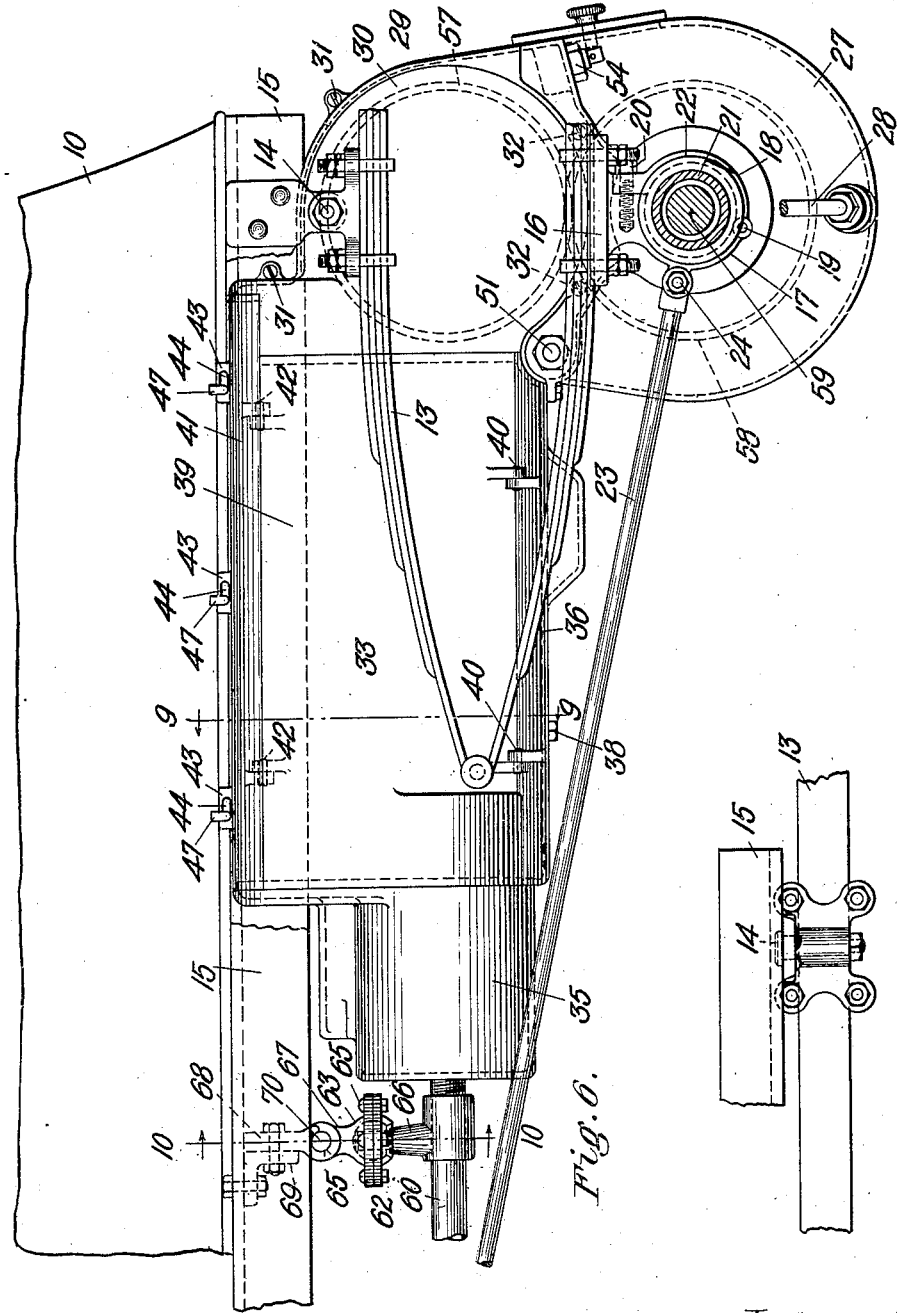

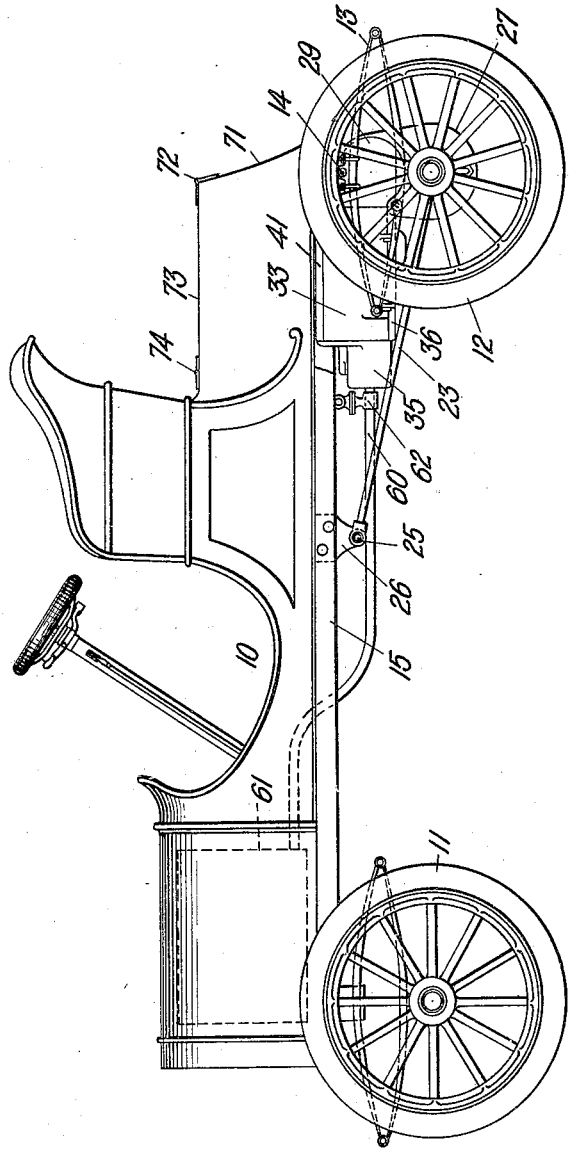

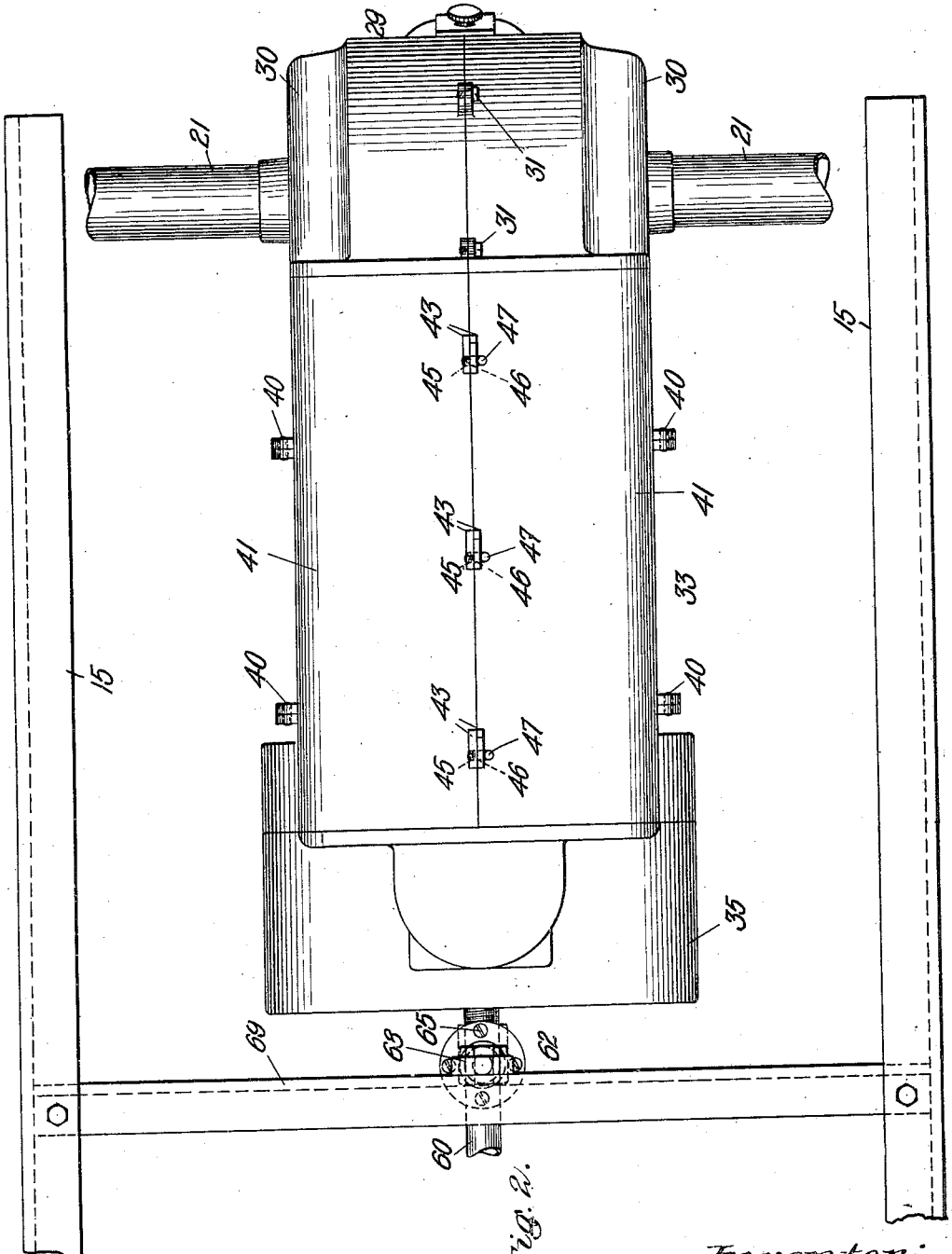

J. N. LEACH.
MOTOR VEHICLE.
APPLICATION FILED NOV. 25, 1907.
917,465.
Patented Apr. 6, 1909.
5 SHEETS—SHEET 3.
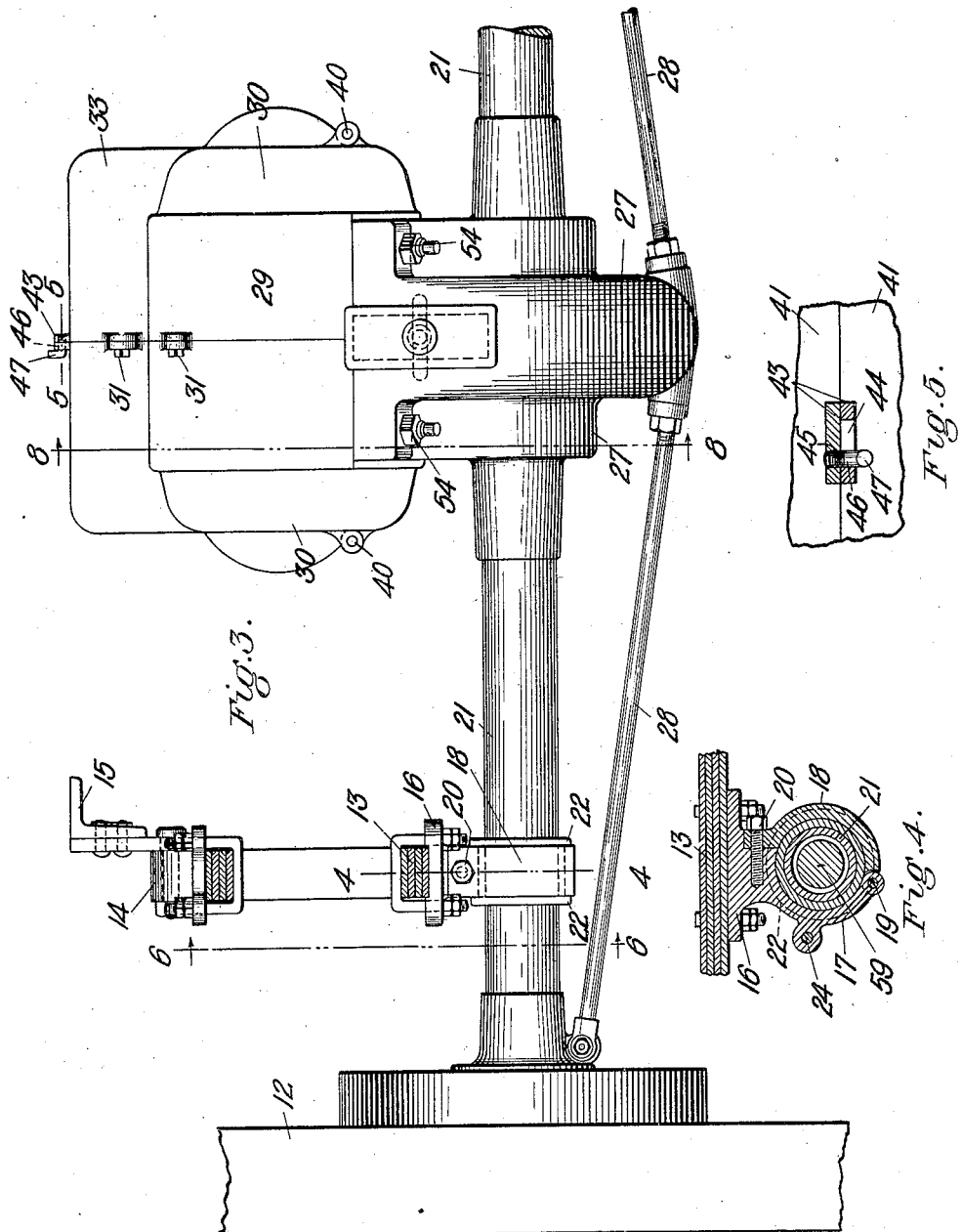

J. N. LEACH.
MOTOR VEHICLE.
APPLICATION FILED NOV. 25, 1907.

917,465.

Patented Apr. 6, 1909.
5 SHEETS—SHEET 4.

Witnesses:

Inventor:

J. N. LEACH.
MOTOR VEHICLE.
APPLICATION FILED NOV. 25, 1907.
917,465.
Patented Apr. 6, 1909.
5 SHEETS—SHEET 5.
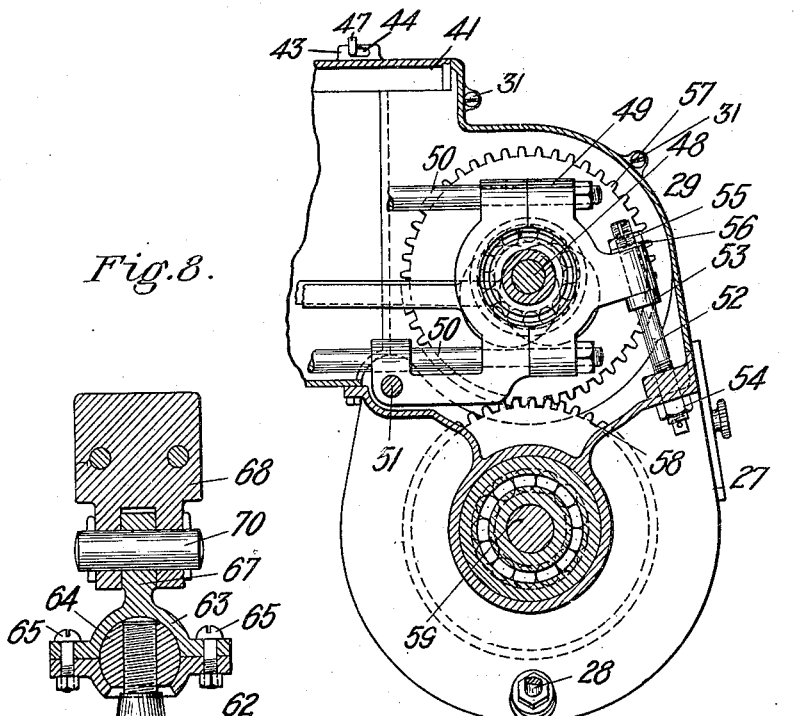
Fig. 8.
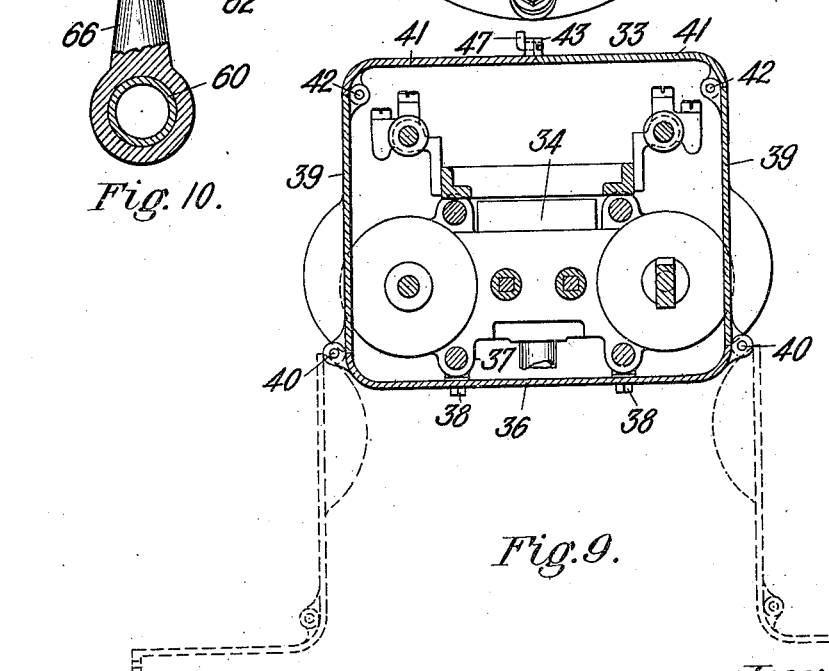
Fig. 10.
Fig. 9.

UNITED STATES PATENT OFFICE.

JOHN N. LEACH, OF MELROSE, MASSACHUSETTS, ASSIGNOR TO JUDSON L. THOMSON M'F'G COMPANY, A CORPORATION OF MAINE.

MOTOR-VEHICLE.

No. 917,465.      Specification of Letters Patent.      Patented April 6, 1909.

Application filed November 25, 1907. Serial No. 403,670.

*To all whom it may concern:*

Be it known that I, JOHN N. LEACH, a citizen of the United States, residing at Melrose, in the county of Middlesex and State of Massachusetts, have invented new and useful Improvements in Motor-Vehicles, of which the following is a specification.

This invention relates to improvements in motor vehicles and particularly to improvements in steam motor vehicles of the type in which the engine is supported on the rear axle, and the object is first, to provide a motor vehicle of this class in which the engine shall be accessible for the purpose of making repairs and adjustments and inspecting the same. Second, to provide a motor vehicle in which the rear axle and its casing may in a few moments be bodily removed from the vehicle. Third, to provide an engine casing which shall thoroughly protect the engine from dust and mud and yet be easily and quickly opened to expose the working parts of the engine. Fourth, to give a greater road clearance beneath the engine, this latter object being attained by mounting the engine crank shaft above the axle and, fifth, to provide means for adjusting the driving gears with relation to each other.

Still other objects and advantages will appear hereinafter.

The invention consists in the combination and arrangement of parts set forth in the following specification and particularly pointed out in the appended claims.

Referring to the drawings: Figure 1 is a side elevation of a motor vehicle embodying my invention. Fig. 2 is an enlarged detail plan of the engine and a portion of the frame, the axle being partly broken away to save space in the drawing. Fig. 3 is an enlarged detail rear elevation, partly broken away and shown partly in section. Fig. 4 is a detail sectional elevation taken on line 4—4 of Fig. 3, looking toward the right. Fig. 5 is an enlarged detail plan section taken on line 5—5 of Fig. 3. Fig. 6 is a sectional elevation taken on line 6—6 of Fig. 3, looking toward the right, partly broken away to save space. Fig. 7 is a detail plan of one of the upper spring seats showing its pivotal connection with the body of the vehicle. Fig. 8 is a sectional elevation, partly broken away, taken on line 8—8 of Fig. 3, looking toward the right. Fig. 9 is a sectional elevation taken on line 9—9 of Fig. 6, looking toward the left. Fig. 10 is an enlarged detail sectional elevation taken on line 10—10 of Fig. 6.

Like numerals refer to like parts throughout the several views of the drawings.

In the drawings, 10 is the body of the motor vehicle supported on front wheels 11 and rear driving wheels 12. Two rear springs 13 are pivoted at 14 on the frame 15 of the body 10. The springs 13 are rigidly secured to spring seats 16 each of which is formed in two members 17 and 18 pivotally connected to each other at 19. Screws 20 having screw-threaded engagement with the members 17 and passing through the members 18 secure said members together. The spring seat 16 surrounds a tubular axle 21 and is journaled thereon, said axle being provided with annular flanges 22 located on each side of the spring seats. Two radius or distance rods 23 pivotally connected at 24 to the spring seats 16 are also pivotally connected at 25 to brackets 26 fast to the frame 15. Rigidly secured to the two parts of the tubular axle 21 is a differential gear casing 27, there being two struts 28 which serve to strengthen the axle 21. A second gear casing 29 is formed in two members 30, 30 which are secured to each other by means of screws 31 and secured to the casing 27 by means of screws 32.

An engine casing 33 which incloses an engine 34 which may be of any suitable construction comprises a cylinder casing 35, a member 36 secured to an engine frame 37 by means of screws 38, two members 39, 39 pivoted at 40, 40 to the member 36, and two members 41, 41 pivoted at 42, 42 to the members 39, respectively. The members 41, 41 are provided, respectively, with lugs 43, 43, the lugs of one of said members being provided respectively, with slots 44 and the lugs of the other of said members being provided, respectively, with screw-threaded holes 45 in which are located L-shaped screws 46 extending through the slots 44, respectively, and serving to attach the adjacent edges of said members together. By rotating the screws 46 90° until their handles 47 are located in alinement with the slots 44, respectively, the two members 41 may be disconnected from each other by drawing them apart, the handles 46 passing through the slots 44. The engine 34 comprises a crank shaft 48 journaled in crank shaft bearings 49 which are secured to rods 50 constituting a part of the engine frame 37. The crank shaft bearings 49 are pivotally supported on a bolt 51 which extends through said bearings and through the casing 27. Studs 52 passing through the casing 27 and having screw-threaded engagement therewith are provided with shoulders 53 on which the crank shaft bearings 49 rest. Nuts 54 having screw-threaded engagement with said studs secure said studs against rotation in the casing 27. Nuts 55 having screw-threaded engagement with the upper ends of the studs 52 bear against washers 56 and serve to rigidly secure said studs to the crank shaft bearings 49.

A spur gear 57 fast to the crank shaft 48 meshes into a spur gear 58 which may be connected to a driving or live axle 59 by means of the customary differential gearing, said live axle being in practice formed in two parts individually connected to the driving wheels 12. By loosening the nuts 54 and 55, the studs 52 may be rotated to adjust the gear 57 toward or away from the gear 58 in order that said gears may be properly meshed.

A steam pipe 60 rigidly connected to the engine 34 is flexibly connected to any suitable type of boiler as 61 which may be mounted on the frame 15 of the vehicle, said steam pipe extending through a depending support 62. The support 62 comprises a ball and socket joint which consists of a socket 63 and a ball 64, said socket being formed in two parts connected by bolts 65. An arm 66 fast to the ball 64 is pivotally and slidably connected to the steam pipe 60, while an arm 67 formed integral with the socket 63 is pivotally connected to a plate 68 fast to a cross piece 69 constituting a part of the frame 15, the pivotal pin 70 extending transversely of the vehicle. The support 62 constitutes a universal connection between the front end of the engine and the frame 15 so that as the body 10 moves up and down on the springs 13 and the frame 15 moves toward and away from the axle 21 the engine 34 and its casing 33 together with the axle 21 swing about the axis of said axle and said axle swivels in the spring seats 16. The pivot 70 and ball and socket 64 and 63 are arranged to permit perfect freedom of movement of the body 10 with relation to the engine and its casing.

The body 10 of the vehicle may be suitably constructed so that the engine and its casing may be gotten at easily. In the present embodiment of my invention, I have shown the body 10 provided with a tailboard 71 hinged at 72 to a cover 73, said cover being hinged at 74 so that said tailboard and cover may be folded up out of the way. When it is desired to get at any of the parts of the engine to adjust or repair them, the casing 33 may be unfastened and opened into the position shown in dotted lines in Fig. 9, thus leaving all of the important working parts of the engine entirely free for inspection. It will be seen that the member 36 of the casing 33 constitutes a pan adapted to receive the excess oil which may drop from the engine 34. If at any time it becomes necessary or desirable to remove the rear axle of the engine bodily from the vehicle, this is done by removing the screws 20 and opening the spring seats 16 by rocking the members 18 on their pivots 19 and after the steam pipe 60 has been disconnected the axle 21, the wheels 12, and the entire engine and its casing may then be bodily withdrawn from the vehicle for such repairs as may be necessary.

Having thus described my invention, what I claim and desire by Letters Patent to secure is:

1. In a motor vehicle, a tubular axle, a driving axle located within said tubular axle, an engine supported on said tubular axle and operatively connected to said driving axle, spring seats surrounding said tubular axle, a body, springs connected to said spring seats and to said body, and distance rods pivotally connected to said spring seats, respectively, and to said body, each of said spring seats being formed in two parts pivotally connected together, whereby said tubular axle may be removed therefrom.

2. In a motor vehicle, a tubular axle, a driving axle located within said tubular axle, an engine comprising a crank shaft supported on said tubular axle to swing about the axis thereof, a gear fast to said crank shaft, and a second gear connected to said driving axle and meshing into said first gear, said crank shaft being adjustable toward and away from said driving axle.

3. In a motor vehicle, a tubular axle, a driving axle located within said tubular axle, an engine comprising a crank shaft supported on said tubular axle to swing about the axis thereof, a gear fast to said crank shaft, a second gear connected to said driving axle and meshing into said first gear, said crank shaft being adjustable toward and away from said driving axle, and means for adjusting said crank shaft toward and away from said driving axle.

4. In a motor vehicle, a tubular axle, a gear casing fast to said axle, a driving axle located within said tubular axle, a crank shaft bearing, means connecting said bearing to said casing, whereby said bearing may be adjusted with relation to said driving axle, a gear fast to said crank shaft, and a second gear connected to said driving axle and meshing into said first gear.

5. In a motor vehicle, a tubular axle, a gear casing fast to said axle, a driving axle located within said tubular axle, a crank shaft, a crank shaft bearing, a gear fast to said crank shaft, a second gear connected to said driving axle and meshing into said first gear, and a screw-threaded stud connecting said bearing to said gear casing, whereby said bearing may be adjusted with relation to said driving axle.

6. In a motor vehicle, a tubular axle, a driving axle located in said tubular axle, an engine supported on said tubular axle to swing about the axis thereof and operatively connected to said driving axle, and an engine casing inclosing said engine, said casing comprising a plurality of pivotally connected sections.

7. In a motor vehicle, a tubular axle, a driving axle located in said tubular axle, an engine supported on said tubular axle to swing about the axis thereof and operatively connected to said driving axle, an engine casing inclosing said engine, said casing comprising a plurality of pivotally connected sections, and means for detachably attaching two adjacent edges of said casing to each other.

8. In a motor vehicle, a tubular axle, a driving axle located in said tubular axle, an engine supported on said tubular axle to swing about the axis thereof and operatively connected to said driving axle, a casing member secured to said engine, and two casing members pivotally connected to said first member.

9. In a motor vehicle, a tubular axle, a driving axle located in said tubular axle, an engine supported on said tubular axle to swing about the axis thereof and operatively connected to said driving axle, a casing member secured to said engine, two casing members pivotally connected to said first member, and two other casing members pivotally connected to said second-named members, respectively.

10. In combination with an engine of a motor vehicle, an engine casing inclosing said engine, said casing comprising a plurality of pivotally connected sections extending entirely around said engine.

11. In combination with an engine of a motor vehicle, an engine casing completely inclosing said engine, said casing comprising a plurality of pivotally connected sections, and means for detachably attaching two adjacent edges of said casing to each other.

12. In combination with an engine of a motor vehicle, a casing member secured to said engine, and two casing members pivotally connected to said first member, said members extending entirely around said engine.

13. In combination with an engine of a motor vehicle, a casing member secured to said engine, two casing members pivotally connected to said first member, and two other casing members pivotally connected to said second-named members, respectively.

14. In combination with an engine of a motor vehicle, a casing member secured to said engine, two casing members pivotally connected to said first member, two other casing members pivotally connected to said second-named members, respectively, and means for detachably attaching the adjacent edges of said last-named members to each other.

15. In a motor vehicle, a tubular axle, a casing fast to said axle, a crank shaft, a crank shaft bearing pivotally connected to said casing, a driving axle located in said tubular axle, a gear fast to said crank shaft, a second gear connected to said driving axle, and means for rocking said crank shaft bearing on its pivot, whereby said first gear may be adjusted with relation to said second gear.

16. In a motor vehicle, a tubular axle, a casing fast to said axle, a crank shaft, a crank shaft bearing pivotally connected to said casing, a driving axle located in said tubular axle, a gear fast to said crank shaft, a second gear connected to said driving axle, and a screw-threaded stud connecting said crank shaft bearing to said casing, whereby said bearing may be rocked on its pivot and said first gear moved with relation to said second gear.

17. In a motor vehicle, an axle, an engine supported on said axle and adapted to swing about the axis thereof, a body supported on said axle, a boiler supported on said body, a depending support secured to said body, and a steam pipe passing through said support and connecting said engine to said boiler.

18. In a motor vehicle, an axle, an engine supported on said axle and adapted to swing about the axis thereof, a body supported on said axle, a boiler supported on said body, a depending support constituting a universal connection between said body and said engine, and a steam pipe passing through said support and connecting said engine to said boiler.

19. In a motor vehicle, a tubular axle, a driving axle located in said tubular axle, an engine supported on said tubular axle to swing about the axis thereof and operatively connected to said driving axle, a cylinder casing, and a plurality of pivotally connected casing members inclosing a portion of said engine.

20. In a motor vehicle, a tubular axle, a driving axle located in said tubular axle, an engine supported on said tubular axle to swing about the axis thereof and operatively connected to said driving axle, a gear casing fast to said tubular axle, and an engine casing inclosing said engine, said engine casing comprising a plurality of pivotally connected members.

21. In a motor vehicle, a tubular axle, a driving axle located in said tubular axle, an engine supported on said tubular axle to swing about the axis thereof and operatively connected to said driving axle, a gear casing fast to said tubular axle, a second gear casing fast to said first gear casing, and an engine casing inclosing said engine, said engine casing comprising a plurality of pivotally connected members.

22. In a motor vehicle, an axle, an engine supported on said axle and adapted to swing about the axis thereof, a body supported on said axle, an arm pivotally connected to said engine, a second arm pivotally connected to said body, and a ball and socket joint connecting said arms to each other.

23. In a motor vehicle, an axle, an engine supported on said axle and adapted to swing about the axis thereof, a body supported on said axle, an arm pivotally connected to said engine, with its axis extending longitudinally of said vehicle, a second arm pivotally connected to said body with its axis extending transversely thereof, and a ball and socket joint connecting said arms to each other.

24. In a motor vehicle, a tubular axle, a driving axle located within said tubular axle, an engine comprising a crank shaft supported on said tubular axle to swing about the axis thereof, said crank shaft being located above said axles, a gear fast to said crank shaft, and a second gear connected to said driving axle and meshing into said first gear.

25. In a motor vehicle, a pair of driving wheels, an axle, an engine supported on said axle and operatively connected to said wheels, spring seats journaled on said axle, a body, and springs connected to said spring seats and to said body, each of said spring seats being formed in two pivotally connected parts, whereby said axle may be removed therefrom.

In testimony whereof I have hereunto set my hand in presence of two subscribing witnesses.

JOHN N. LEACH.

Witnesses:
   LOUIS A. JONES,
   SADIE V. MCCARTHY.